United States Patent [19]

Breuner

[11] Patent Number: 4,741,672
[45] Date of Patent: May 3, 1988

[54] COLLECTIVE PITCH CHANGE SYSTEM FOR TETER-BAR TYPE GYROPLANE ROTARY WING AIRCRAFT

[76] Inventor: Gerald Breuner, 4114 Goodrick Ave., Richmond, Calif. 94801

[21] Appl. No.: 54,526

[22] Filed: May 27, 1987

Related U.S. Application Data

[63] Continuation-in-part of Ser. No. 752,836, Jul. 8, 1985, abandoned.

[51] Int. Cl.[4] .................. B64C 27/36; B64C 27/76
[52] U.S. Cl. ........................... 416/148; 416/167
[58] Field of Search ............ 416/102, 148, 147, 158, 416/167, 89, 23

[56] References Cited

U.S. PATENT DOCUMENTS

| | | | |
|---|---|---|---|
| 2,205,835 | 6/1940 | Landrum | 416/89 |
| 2,443,808 | 6/1948 | Stalker | 416/147 |
| 2,624,531 | 1/1953 | Stalker | 416/102 X |
| 2,830,669 | 4/1958 | Klockner | 416/102 X |
| 2,939,535 | 6/1960 | Brye | 416/102 X |
| 3,384,184 | 5/1968 | Schramm | 416/148 X |
| 4,137,010 | 1/1979 | Stroub | 416/89 X |
| 4,452,411 | 6/1984 | Eickmann | 416/DIG. 2 |
| 4,653,705 | 3/1987 | Bensen | 416/171 X |

FOREIGN PATENT DOCUMENTS

| | | | |
|---|---|---|---|
| 449741 | 7/1948 | Canada | 416/148 |
| 315861 | 11/1919 | Fed. Rep. of Germany | 416/23 |
| 1024806 | 2/1958 | Fed. Rep. of Germany | 416/89 |
| 1226719 | 7/1960 | France | 416/158 |
| 590735 | 7/1947 | United Kingdom | 416/102 |

*Primary Examiner*—Everette A. Powell, Jr.
*Attorney, Agent, or Firm*—David C. Ripma

[57] ABSTRACT

A collective pitch change system for gyroplane rotary wing aircraft is provided. The system is particularly adapted for teter-bar rotors and is simple and direct. The system can change the blade pitch while the rotor is rotating to permit jump take-offs.

9 Claims, 4 Drawing Sheets

COLLECTIVE PITCH CHANGE SYSTEM FOR TETER-BAR TYPE GYROPLANE ROTARY WING AIRCRAFT

This application is a continuation-in-part of now abandoned U.S. application Ser. No. 06/752,836, filed July 8, 1985, entitled "Collective Pitch Change System for Gryoplane Rotary Wing Aircraft," invented by Gerald Breuner.

BACKGROUND OF THE INVENTION

This invention relates generally to gyroplane rotary wing aircraft, also known as autogyros, and more particularly to a system of collective blade pitch adjustment for use on teter-bar type gyroplane rotors.

Gyroplane rotary wing aircraft, historically called autogyros, have flown with various types of rotors and rotor hubs. In order to fly successfully, all gyroplanes must incorporate certain essential features in their rotors. Gyroplane rotors, the rotary wings which keep the aircraft aloft, are rotated by air currents, not by engine torque, as with helicopters. A propeller pushes or pulls the gyroplane through the air like an airplane, and the air currents cause the rotor to turn by a process called autorotation. As the rotating blades pass through the air during forward flight, the blades on one side of the rotor are advancing, producing higher relative air speed, as compared with the retreating blades on the other side of the rotor. To compensate for differences in the lift between the advancing and retreating blades, all gyroplane rotors include some means to permit the rotor blades to "flap," or move up and down as they circle the rotor hub. The flapping of the blades equalizes the lift and permits the gyroplane to move laterally through the air in stable flight. The need to provide for rotor blade flap, as well as other articulations inc ertain gyroplane designs, has led to various types and configurations of rotors and rotor hubs. By the end of the first phase of gyroplane (autogyro) design, in the 1940s, relatively complex rotors and hubs were in use. Such rotors, generally called fully articulated rotors, are similar to helicopter rotors. To these relatively complex, fully articulated rotors, collective pitch control was eventually added. Collective pitch control is a system for chainging the pitch of all the rotor blades simultaniously. Collective pitch control allows the gyroplane to perform a jump take-off, using a mechanical pre-spin system for turning the rotor. A jump take-off is achieved by spinning the rotor rapidly with the rotor blades de-pitched, and then adding positive pitch to all blades simultaneously, producing instant vertical lift. The jump take-off was an important advance for gyroplanes, but it was only achieved with relatively complex to operate mechanisms which were also mechanically complex. Even with jump take-off, the gyroplane could not compete with the helicopter, which quickly captured the market for rotary wing aircraft.

An important area of focus in recent years has been the design of simple ultralight gyroplanes which usually seat just one person. These gyroplanes use simple two-blade rotors and avoid the complex fully articulated hubs of earlier multi-blade designs. Since the new, simpler gyroplanes must contend with the same physical forces as their more complex predecessors, some form of blade articulation still must be provided. The solution employed in simple, modern gyroplanes is what is termed a "teter-bar" blade mounting; also known as a "see-saw type" blade mounting. In such a rotor, a teter-bar is mounted, underslung, between upright plates, with a blade attached to each end of the teter-bar. The plates, teter-bar and blades all turn on a hub. Such a rotor system is commonly termed "semi-rigid," since it retains the flap motion but forces the blades to move together, in a see-saw fashion. Teter-bar rotors are simple and effective and it would be advantageous to be able to incorporate a means for producing a collective pitch change in such rotors to permit jump takeoffs. It would also be advantageous to provide a system for collective pitch change in a teter-bar rotor which is both simple and rugged.

SUMMARY OF THE INVENTION

Accordingly, a collective pitch change means is provided for use with a rotor assembly of a gyroplane rotary wing aircraft. The rotor assembly being mounted on a rotatable hub and including a pair of blades attached to opposite ends of a central teter-bar having a pivotal mounting which permits the teter-bar and attached blades to move together in a see-saw type motion. The collectie pitch change means comprises an adjustable balde attachment at each opposed end of the teter-bar for attachment of the blades to the teter-bar. Each adjustable blade attachment includes a feathering pivot for permitting rotation of the blade around a generally radial-extending feathering axis to change the pitch of the blades. Pitch adjustment means are also included for rotating the blades relative to the teter-bar around the feathering pivot. A simultaneous actuator means is provided for operating both the pitch adjustment means together, such that the pitch is changed simultaneously on both blades. A spring bias means mounted on the teter-bar supplies the motive force to change the pitch of the blades. Several alternative embodiments of the invention are discribed.

DETAILED DESCRIPTION OF THE PREFERRED EMBODIMENT

Figure 1:
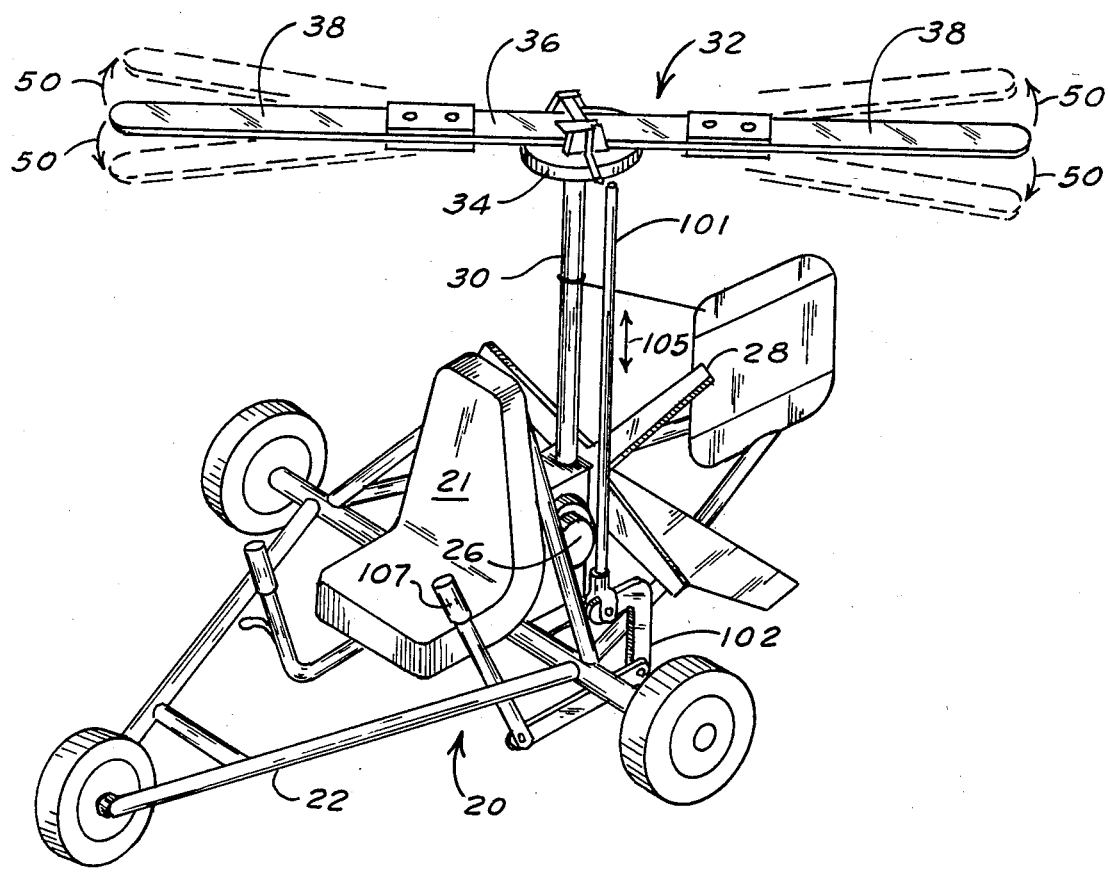
FIG. 1 is a partial schematic perspective view of a gyroplane having a teter-bar type rotor which generally illustrates the collective pitch change means of the present invention.

Referring to FIG. 1, a lightweight gyroplane rotary wing aircraft equipped with a teter-bar type rotor is illustrated schematically. The illustration of gyroplane 20 in FIG. 1 is intended to show the general layout of the craft. Mounted on a lightweight tubular frame 22 are a seat 21 and engine 26, which drives a pusher propeller 28. Rising behind the pilot's seat is a mast 30 which supports a rotor 32. The rotor includes a hub 34 to which is attached a teter-bar 36 supported for movement in a see-saw fashion. The mounting of hub 34 on mast 30 is not part of the present invention and is not shown in the schematic drawing of FIG. 1. Teter-bar hubs are usually gimbal-mounted on the mast to permit the hub to be tilted as the aircraft is operated, although other suitable mountings are possible. The present invention is directed to a means for changing the pitch of the blades on a teter-bar type rotor, regardless of the type of mounting used to attach the hub to the mast or the means for controlling the attitude of the hub relative to the gyroplane.

Figure 2:
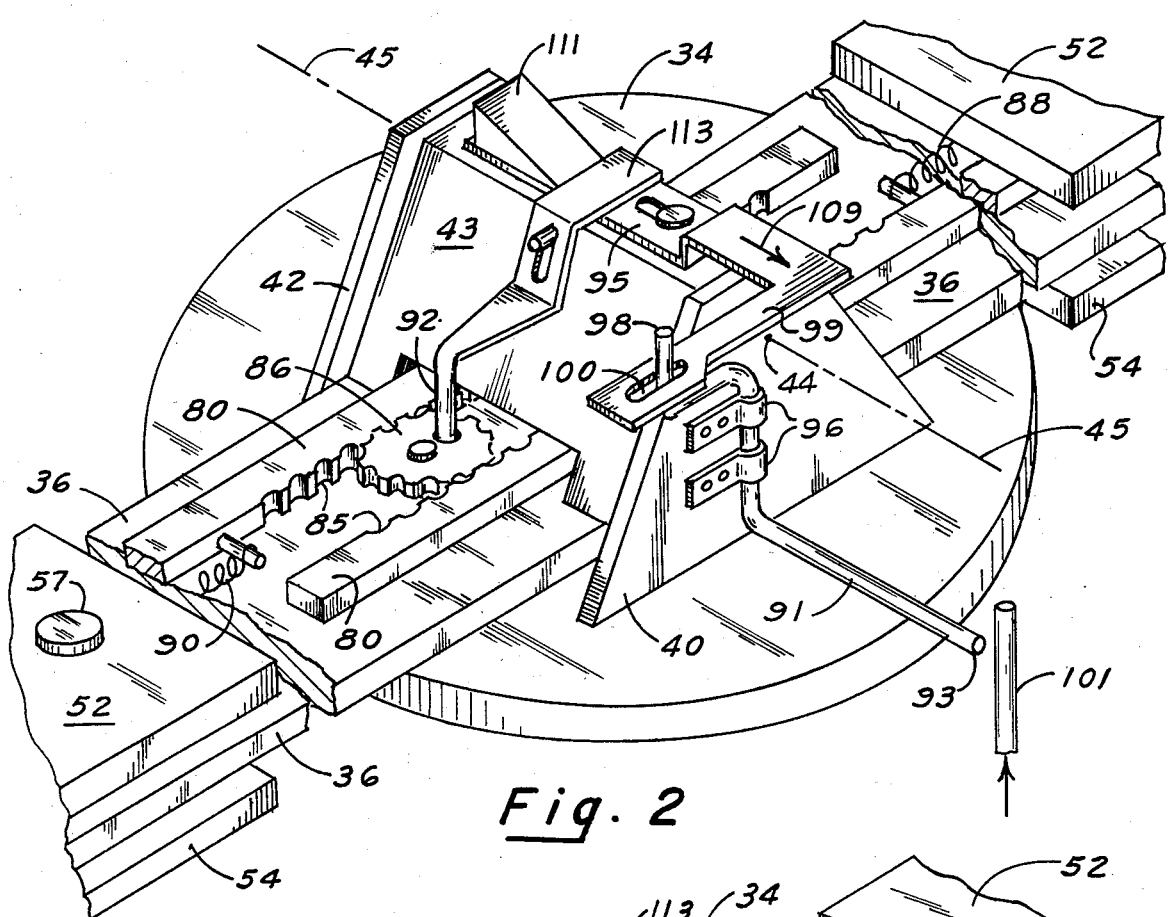
FIG. 2 is a partial enlarged perspective view of the rotor hub of FIG. 1 showing the pitch change means of the present invention in an energy storage mode in which spring energy is stored for selective release to change the pitch of the blades.
Figure 3:
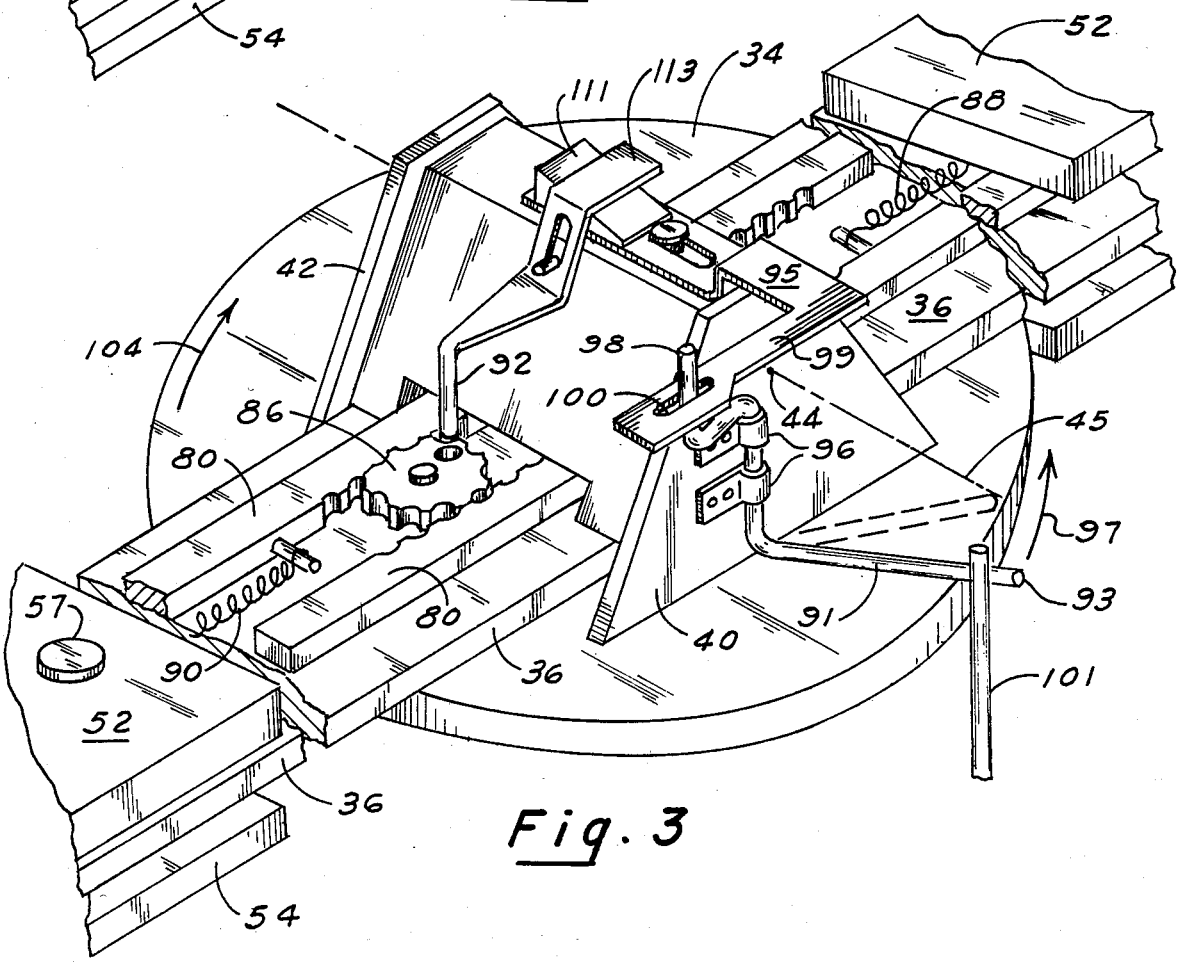
FIG. 3 is a view of the rotor hub as in FIG. 2 showing the aircraft rotated slightly relative to the hub and the pitch change means of the present invention after release of the pitch change means from its energy storage mode.

Details of the teter-bar construction are shown most clearly in FIGS. 2 and 3. The teter-bar 36 is supported from a pair of upright plates 40 and 42 on hub 34. A pin 44 passes through plates 40 and 42 and a supporting block 43, attached to teter-bar 36, and provides a rotational support for the teter-bar on the hub. The teter-bar 36 is movable in a see-saw fashion on hub 34 around the axis 45 of pin 44; the bar being underslung from pin 44. Motion of the teter-bar and blades around pin 44 is shown by arrows 50 in FIG. 1.

Figure 4:
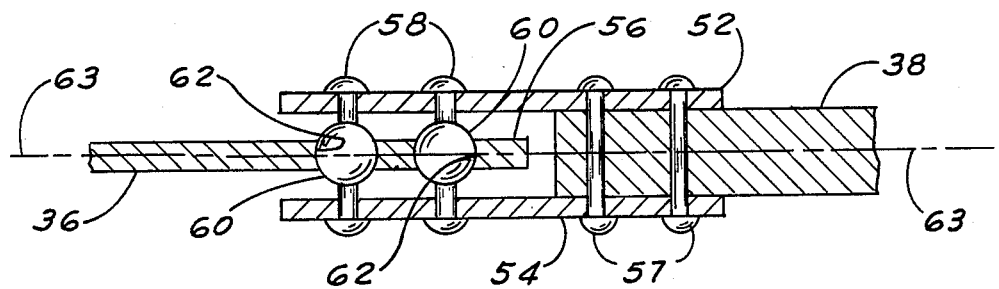
FIG. 4 is a partial cross-sectional view of a portion of the teter-bar of FIGS. 1-3, showing an illustrative prior art means of attachment of a blade to one end of the teter-bar.

FIG. 4 shows one suitable means of attaching blades 38 to the opposed ends of teter-bar 36. The blades are attached in a first region in which portions of the blade extend approximately parallel and proximate to the end of the teter-bar. In the preferred embodiment, each blade 38 includes upper and lower straps 52 and 54, extending from its innermost end where it attaches to teter-bar 36. Straps 52 and 54 can be attached to the blade 38 by any conventional means, such as rivets 57. The straps form a yoke into which the end 56 of teter-bar 36 extends. A plurality of bolts 58 extend through both the blade straps 52 and 54 and the end of the teter-bar to attach the blade to the teter-bar. Bolts 58 also include a pivot bearing 60, in the form of a ball or equivalent bearing surface, which rides within a cooperating bearing surface 62 within or adjacent to teter-bar 36. The pivot bearing in each bolt permits the bolts 58 to rotate or pivot relative to teter-bar 36 around a feathering axis 63. Blade straps 52 and 54 are spaced apart a distance greater than the thickness of teter-bar 36 and the interconnection between the blades and teter-bar should include some suitable means for maintaining a space between the interleaved parts, as shown in FIG. 4. Bolts 58 are colinear, and the space between straps 52, 54 and teter-bar 36, together with the presence of pivot bearings 60, permits blades 38 to rotate around feathering axis 63. Feathering axis 63 extends generally radially from the hub lengthwise along teter-bar 36 and is the axis around which each blade 38 pivots to change the pitch of the blades. Such a pitch change is commonly referred to as "feathering," and pivots 60 will be referred to herein as feathering pivots. The amount of pitch change permitted by feathering pivots 60 and the spacing between the blade straps and the teter-bar will be small; for example, approximately 3 to 5 degrees.

Figure 5:
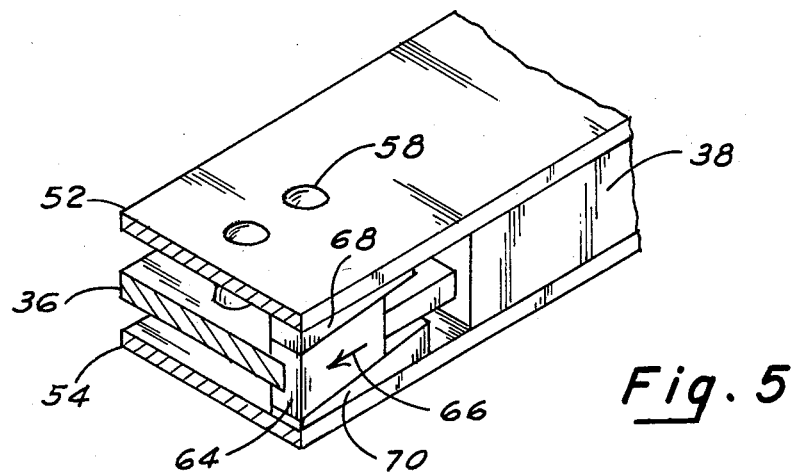
FIG. 5 is a partial perspective view in partial cross-section of the region of attachment of a blade to the teter-bar, as shown in FIG. 4, showing a portion of one embodiment of a pitch change mechanism in accordance with the present invention.
Figure 6:
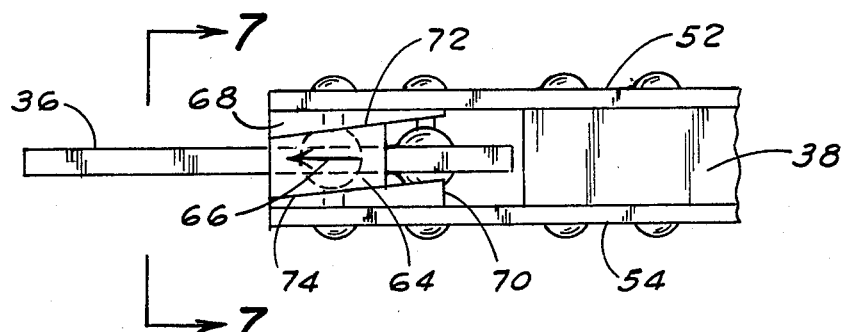
FIG. 6 is a side view as in FIG. 4 illustrating the action of the pitch change mechanism shown in FIG. 5.
Figure 7:
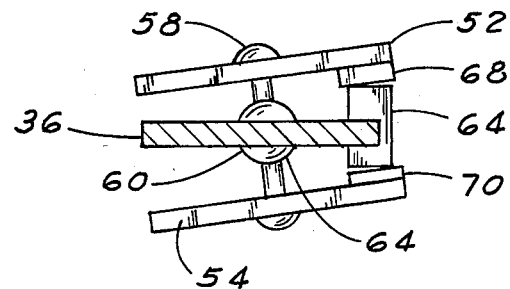
FIG. 7 is an end cross-sectional view taken along line 7—7 of FIG. 6 showing the action of the pitch change mechanism of FIG. 5.

The collective pitch change means of the present invention is a means for rotating the blades around their respective feathering pivots while the rotor is turning. In the preferred embodiment, the blade rotation is accomplished by leverage means which exert a relative force between the teter-bar and the blades. FIGS. 5 through 7 show one type of leverage means suitable for this purpose. A channeled wedge-piece 64 is retained against the side edge of teter-bar 36. Wedge piece 64 is movable along the teter-bar edge radially inwardly in the direction of arrow 66. Any suitable means can be used to retain wedge piece 64 against teter-bar 36, such as, for example, bolts extending through longitudinal slots (not shown) in the wedge piece. Cooperating incline surfaces 68 and 70 attached to the facing interior surfaces of blade straps 52 and 54, respectively, ride against respective outer incline surfaces 72 and 74 of the wedge piece. Thus, as wedge piece 64 moves in the direction of arrow 66, the wedge piece exerts a relative force between the teter-bar and the blade straps, producing relative motion therebetween. As a result, the blade is rotated around feathering pivots 60 and feathering axis 63, as shown in FIG. 7. The pitch adjustment means shown in FIGS. 5 through 7 acts, in effect, to inseert a wedge or incline between the blade and teter-bar to pivot the blade relative to the teter-bar. Because of the arrangement of inclines 68 and 70, and the fact that both remain in contact with cooperating surfaces 72 and 74 on the wedge piece, no looseness or play will develope in the blade or its pitch orientation.

Figure 8:
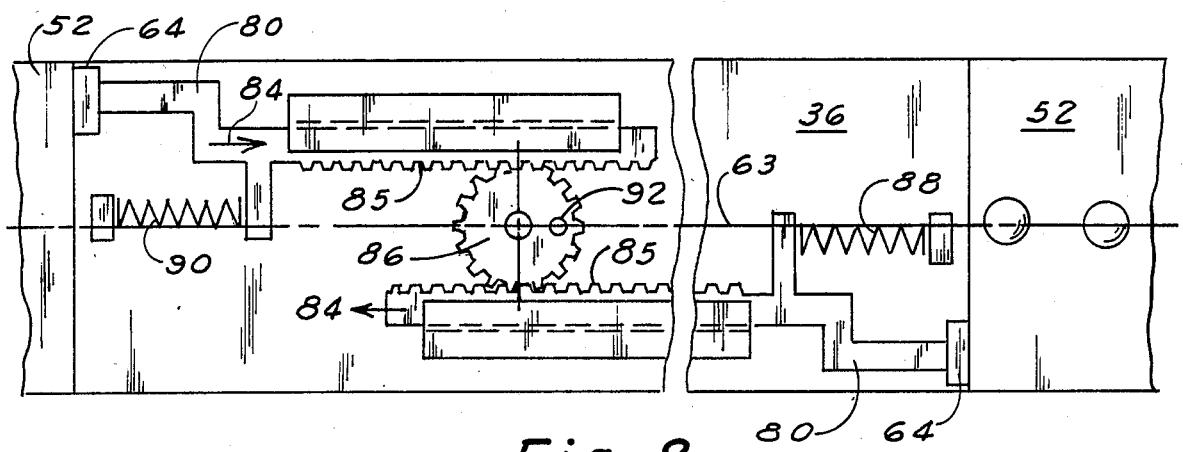
FIG. 8 is a partial top plan view of a teter-bar as in FIGS. 2 through 7 showing one embodiment of a simultaneous actuator for use with the present invention.

The respective wedge pieces 64 on each end of the teter-bar are moved relative to the teter-bar by first actuators 80, shown in FIG. 8. The actuators 80 are elongated members mounted on teter-bar 36 for limited movement relative to the teter-bar in a direction generally parallel to feathering axis 63. Each actuator 80 is coupled at one end to wedge piece 64. Thus, when actuators 80 move in the direction of arrows 84, they move the wedge pieces 64 at the opposite ends of teter-bar 36. The wedge pieces 64 act as means for exerting a relative force between the teter-bar and the blades to change the pitch of the blades by rotating the blades around feathering axis 63.

It is important to the operation of the collective pitch change system of the present invention that the pitch of both blades be changed simultaneously. A simultaneous actuator is therefore provided, one embodiment being shown in FIG. 8. A cogged rack 85 is provided on each actuator 80 for movement laterally in the direciton of arrows 84. A central pinion 86 rotatably mounted on teter-bar 36 engages the racks of both actuators 80 to form a rack and pinion, producing simultaneous and equal motion between the actuators. The actuators, in turn, move wedge pieces 64 simultaneously. As such, the pitch of both blades 38 is simultaneously changed when pinion 86 rotates within racks 85.

Motive force for operating the pitch adjustment system of the present invention is supplied by spring energy. Springs 88 and 90 on teter-bar 36 exert force against actuators 80 to move wedge pieces 64 and change the pitch of the blades. The pitch change system of the present invention is designed for one-shot or single-action operation. In other words, the collective pitch change operates to rotate or change the pitch of the blades in one direction only. It is intended to provide for jump take-offs, wherein the rotor is first spun with the blades de-pitched or flat until a suitable rotor speed is attained. A mechanical pre-spin system (not shown) can be used to spin the rotor. Although two springs are shown in the figures, a single spring of sufficient force or another spring bias means could be used to supply the spring energy.

The system of the present invention will change the pitch of the blades form flat to an angle of, for example, 3 to 5 degrees. Instant lift is thereby produced when the blades are spinning, causing a jump take-off. The blades will not be depitched again until the rotor is stopped at the end of the fight. For this reason, spring 88 and 90 are assumed to be compressed or otherwise in an energy storage mode when the blades are depitched at the start of the flight. Similarly, blades 38 start out as shown in FIGS. 4 and 5 and wedge piece 64 is in a first position as shown in FIGS. 4 and 5, before any movement in the direction of arrows 66.

A suitable spring release means is provided for retaining actuators/racks 80 in their respective first positions when the blades are flat. Such a suitable spring release is pin 92, which engages pinion 86 and prevents it from turning. A release means such as pin 92 would restrain spring 88 and 90 from supplying motive force to actuators 80 until desired by the pilot of the aircraft. Only when pin 92 is removed from engagement with pinion 86 will springs 88 and 90, and actuators 80, be released to move under the motive force of the stored spring energy.

A suitable release means for selectively removing pin 92 from engagement with pinion 86 is illustrated in FIGS. 2 and 3. A second actuator 91 is mounted on the hub 34 and extends, in one position, radially outwardly from the hub at its outermost extremity 93. Pin 92 is mounted on teter-bar mounting block 43 for movement into and out of engagement with pinion 86, as illustrated, respectively, in FIGS. 2 and 3. When pin 92 is in a first position, shown in FIG. 2, the pitch change mechanism is in an energy storage mode in which the spring energy of springs 88 and 90 is prevented from moving actuators 80 by the engagement of pin 92 with pinion 86. When pin 92 is moved to a second position, shown in FIG. 3, the pin 92 is disengaged from pinion 86 and the energy of springs 88 and 90 are released from their energy storage modes to move actuators 80 and change the pitch of the blades, using wedge pieces 64 shown in FIGS. 5 through 7. In order to move pin 92 from the position shown in FIG. 2 to the position shown in FIG. 3, a linkage 95 is mounted for movement on teter-bar support block 43. The operation of linkage 95 is illustrated in FIGS. 2 and 3. Actuator lever 91 is mounted for rotation relative to hub 34 by brackets 96, which permit the actuator 91 to rotate in the relative direction of arrow 97. The inner end 98 of acutator 91 extends through a slot 100 in an arm 99 attached to linkage 95. A third actuator 101 is mounted for vertical movement, parallel with mast 30. FIG. 1 shows a suitable linkage 102 for operating third actuator 101, which is movable in the direction of arrows 105 by a suitable control arm 107, operated by the pilot. The third actuator 101 is positioned to selectively intercept the path of movement of the outer end 93 of actuator 91, as the hub is rotating. When the pilot, using control arm 107, moves actuator 101 vertically from the position shown in FIG. 2 to the position shown in FIG. 3, actuator 101 intercepts the path of actuator 91 as it rotates with the hub (in the direction of arrow 104), causing actuator 91 to be moved, relative to the hub, in the direction of arrow 97. Movement of actuator 91 causes simultaneous movement of linkage 95 in the direction of arrow 109 (FIG. 2). An incline ramp 111 on linkage 95 cams against a cooperating surface 113 attached to pin 92, raising pin 92 out of engagement with pinion 86. Actuator 91 is mounted so as to rotate out of the path of actuator 101, as shown in phantom in FIG. 3. As such, actuator 101 strikes actuator 91 only once to release the pin 92.

In the manner described above, the pilot can effect removal of pin 92 while rotor 32 is rotating. Removal of pin 92 releases stored spring energy to produce a pitch change in blades 38.

The springs which provide the motive force to actuators 80 on the teter-bar are resettable to their energy storage mode only when the rotor is not turning. Before each flight in which jump take-off is to be performed, the acutators 80, wedges 64 and blades 38 are all put in their respective first positions wherein the blades are depitched and springs 88 and 90 are compressed. Any suitable means can be used to reset the pitch change system to its starting position, such as, for example, a crank (not shown) or the like, to rotate pinion 86, after which pin 92 is reinserted to prevent the turning of pinion 86.

Figure 9:
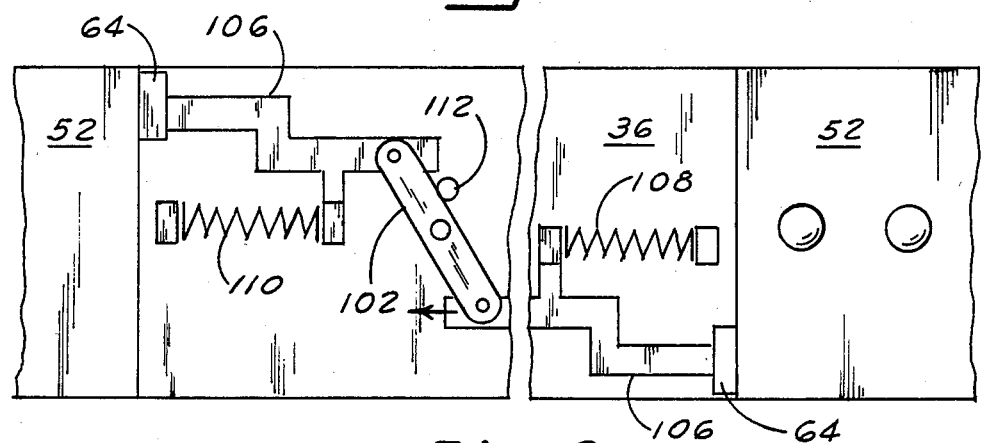
FIG. 9 is a partial top plan view of a teter-bar as in FIGS. 2 through 7 showing an alternative embodiment of the simultaneous actuator shown in FIG. 8.

An alternative simultaneously actuator, replacing pinion 92 and cooperating racks 85, is shown in FIG. 9. A double action lever 102 is pivotally mounted on teter-bar 36 and two actuator linkages 106, equivalent to actuators 80, extend from lever 102 to each of the wedge pieces 64. Springs 108 and 110 provide motive force in exactly the same manner as springs 88 and 90 in the previous embodiment. Similarly, a pin 112 or other spring release means can be used to hold the lever 102, springs and linkages in their respective energy storage modes in the same manner as pin 92. As in the previous embodiment, the springs are released by the linkages shown in FIGS. 2 and 3 and are resettable when the rotor is not turning.

Figure 10:
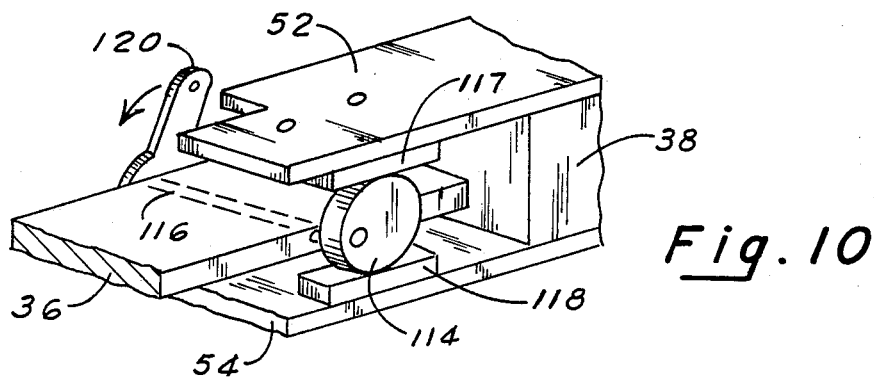
FIG. 10 is a partial perspective view in partial cross-section, as in FIG. 5, showing a portion of an alternative embodiment of a pitch change mechanism for use with the present invention.
Figure 11:
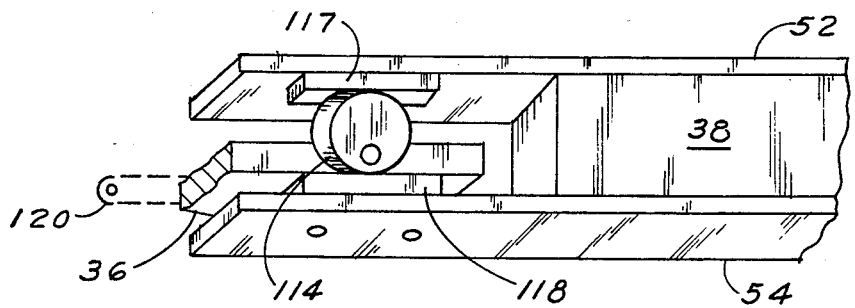
FIG. 11 is an alternative view of the pitch change mechanism of FIG. 10 showing the operation of the leverage means of the embodiment of FIG. 10.

An alternative embodiment of leverage means 64 for exerting relative force between the teter-bar and the blades to rotate the blades is shown in FIGS. 10 and 11. In this embodiment, a rotatable eccentric 114 is used to produce relative motion between blade straps 52, 54 and teter-bar 36. Eccentric 114 is carried on a shaft 116, mounted on or extending through teter-bar 36. Eccentric 114 preferably rides in a slot or groove such as that formed by plates 117, 118 attached to the blade straps 52 and 54, respectively. A lever arm 120 on shaft 116 is used to actuate eccentric 114. Actuators, including devices to insure simultaneous actuation, such as those shown in FIGS. 8 and 9, are used to engage and operate the eccentric to produce blade pivot.

The collective pitch change system of the present invention provides a simple and effective means for giving gyroplanes with teter-bar rotors jump take-off capability. The system does not require major redesign of the teter-bar or blades, particularly since adjustable blade attachments such as that shown in FIG. 4 are presently incorporated into teter-bar rotors to facilitate alignment. Use of a one-shot depitch-to-pitch control simplifies the control linkages required, consistent with the overall simplicity of teter-bar rotor systems. The system can be selectively employed only when a jump take-off is desired. If the user does not require a jump take-off, the blades, levers, actuators and springs are left in their pitched orientations and the system is simply not "cocked" for use in the next take-off. A collective pitch change feature which gives teter-bar rotor gyroplanes the ability to jump take-off represents a significant enhancement in the performance and marketability of such gyroplanes.

While particular embodiments of the invention have been shown and described, other embodiments are possible within the scope of the present invention. For example, it would be possible to use the system on teter-bar blade mounts which have the straps fixedly attached to the teter-bar and the blade root interleaved between the teter-bar straps. Or, instead of using a wedge piece 64, a simple wedge or incline inserted into the gap between the teter-bar and straps could be used to rotate the blades.

The present invention provides a means for collective pitch change in teter-bar rotors to permit jump take-offs. The collective pitch change system is both simple and rugged.

What is claimed is:

1. Collective pitch change means for a rotor assembly of a gyroplane rotary wing aircraft wherein the rotor assembly is mounted on a rotatable hub and includes a pair of blades attached to opposite ends of a central teter-bar having a pivotal mounting which permits the teter-bar and attached blades to move together in a see-saw type motion, said collective pitch change means comprising: adjustable blade attachment means at each opposed end of the teter-bar for attaching the blades to the teter-bar, each said adjustable blade attachment means including a feathering pivot for permitting rotation of the blades around a feathering axis which extends generally radially from said hub lengthwise along said teter-bar to change the pitch of the blade, pitch adjustment means for rotating the blade relative to the teter-bar around said feathering pivot, said pitch adjustment means including a first actuator mounted on said said teter-bar for limited movement in a direction generally parallel to said feathering axis, spring bias means mounted on said teter-bar for supplying motive force to move said first actuator relative to said teter-bar, and means coupled to said first actuator for exerting a relative force between the teter-bar and the blade to change the pitch of the blade when said first actuator is moved by said spring bias means, simultaneous actuator means for operating both said pitch adjustment means together such that the pitch is changed simultaneously on both blades, and release means for retaining said spring bias means in an energy storage mode in which spring bias means is restrained from supplying motive force to said first actuators and for selectively releasing said spring bias means from said energy storage mode whereby spring energy moves said first actuators to change the pitch of said blades.

2. Collective pitch change means as in claim 1 in which the adjustable blade attachment means at each end of the teter-bar includes a first region where the blade extends approximately parallel and proximate to the teter-bar, and said means coupled to said first actuator for exerting a relative force between the teter-bar and the blade includes means for inserting a wedge between the blade and the teter-bar in said first region to produce relative motion around said feathering pivot between the blade and the teter-bar when said first actuator is moved by said spring bias means.

3. Collective pitch change means as in claim 1 in which said simultaneous actuator means includes rack and pinion means on said teter-bar for simultaneously moving both said first actuators relative to the teter-bar.

4. Collective pitch change means as in claim 1 in which each said pitch adjustment means rotates the blade relative to the teter-bar in one direction only while the rotor is rotating whereby said collective pitch change means can change the pitch of the blades in one direction only while the rotor is rotating.

5. Collective pitch change means as in claim 1 in which said release means includes a second actuator extending radially outwardly from said hub, a pin movable with respect to said teter-bar for retaining said spring bias means in said energy storage mode when in a first portion, said pin being movable to a second position in which said spring bias means is released from said energy storage mode, linkage means for moving said pin from said first to said second position upon movement of said second actuator relative to said hub, and a third actuator movable relative to said hub for selectively intercepting the path of movement of said second actuator while the hub is rotating to induce relative movement between said second actuator and said hub.

6. Collective pitch change means as in claim 1 in which said pitch adjustment means includes leverage means on said teter-bar for exerting a relative force between the teter-bar and the blade to rotate the blade and change the pitch thereof.

7. Collective pitch change means for a rotor assembly of a gyroplane rotary wing aircraft wherein the rotor assembly is of the type which includes a pair of blades attached to opposite ends of a central rotatable teter-bar having a pivotal mounting which permits the teter-bar and attached blades to move together in a see-saw type motion, said collective pitch change means being a single action device for increasing the pitch of the blades by a predetermined amount at a selected time while the rotor is turning, comprising: adjustable blade attachment means at each opposed end of the teter-bar for attaching the blades to the teter-bar, each said adjustable blade attachment means including a feathering pivot for permitting rotation of the blade around a generally radially extending feathering axis to change the pitch of the blade, and including pitch adjustment means for rotating the blade relative to the teter-bar around said feathering pivot, said pitch adjustment means including a first actuator on said teter-bar and leverage means connected to said first actuator for exerting a relative force between the teter-bar and the blade to rotate the blade and change the pitch thereof, simultaneous actuator means for operating both said pitch adjustment means, including said first actuators and said leverage means, together such that the pitch is changed simultaneously on both blades, and single-action motive means for supplying motive force to operate said pitch adjustment means while the rotor is turning.

8. Collective pitch change means as in claim 7 in which said single-action motive means includes spring bias means on the teter-bar for supplying the motive force when in an energy storage mode to operate said pitch adjustment means while the rotor is turning by means of spring energy, said spring bias means being resettable to said energy storage mode only when the rotor is not turning.

9. Collective pitch change means as in claim 8 including spring release means on the teter-bar for retaining said spring bias means in an energy storage mode, and linkage means extending between the teter-bar and a control position for controlling the operation of the gyroplane rotory wing aircraft, wherein said linkage means actuates said spring release means such that a collective pitch change can be effected.

* * * * *